(12) United States Patent
Lay et al.

(10) Patent No.: US 8,728,367 B2
(45) Date of Patent: May 20, 2014

(54) PROCESS FOR PRODUCING LINEAR PROFILES

(75) Inventors: Reiner Lay, Aachen (DE); Paul Wynen, Neerpelt (BE)

(73) Assignee: Robert Bosch GmbH, Stuttgart (DE)

( * ) Notice: Subject to any disclaimer, the term of this patent is extended or adjusted under 35 U.S.C. 154(b) by 705 days.

(21) Appl. No.: 12/811,851

(22) PCT Filed: Jan. 13, 2009

(86) PCT No.: PCT/EP2009/050293
§ 371 (c)(1),
(2), (4) Date: Jul. 7, 2010

(87) PCT Pub. No.: WO2009/090157
PCT Pub. Date: Jul. 23, 2009

(65) Prior Publication Data
US 2010/0276845 A1 Nov. 4, 2010

(30) Foreign Application Priority Data
Jan. 16, 2008 (DE) .......................... 10 2008 004 636

(51) Int. Cl.
| | | |
|---|---|---|
| *B32B 37/00* | (2006.01) | |
| *B29C 35/10* | (2006.01) | |
| *B32B 33/00* | (2006.01) | |
| *B32B 25/00* | (2006.01) | |
| *B29C 47/00* | (2006.01) | |
| *B60S 1/04* | (2006.01) | |

(52) U.S. Cl.
USPC ........... 264/139; 264/464; 264/495; 264/167; 264/173.17; 264/174.11; 264/177.1; 264/37.3; 264/37.32; 15/121; 15/250.001

(58) Field of Classification Search
None
See application file for complete search history.

(56) References Cited

U.S. PATENT DOCUMENTS

| | | | | |
|---|---|---|---|---|
| 3,255,284 | A | * 6/1966 | Meislohn | ....................... 264/560 |
| 3,479,419 | A | 11/1969 | Hochhauser | |
| 3,883,384 | A | * 5/1975 | Hopkins | .................. 156/244.13 |
| 4,702,867 | A | 10/1987 | Sejimo et al. | |
| 4,731,139 | A | * 3/1988 | Feyerabend et al. | .......... 156/154 |
| 4,744,851 | A | * 5/1988 | Lorenz | ........................... 156/289 |
| 4,981,637 | A | * 1/1991 | Hyer | ............................. 264/146 |
| 5,204,035 | A | * 4/1993 | Boltze et al. | .................. 264/146 |
| 5,462,707 | A | * 10/1995 | Nagy | ............................. 264/146 |

(Continued)

FOREIGN PATENT DOCUMENTS

| | | |
|---|---|---|
| DE | 2113984 A1 | 10/1972 |
| DE | 2122578 A1 | 11/1972 |
| DE | 102005000851 A1 | 8/2005 |

(Continued)

OTHER PUBLICATIONS

PCT/EP2009/050293 International Search Report.

*Primary Examiner* — Jeffrey Wollschlager
(74) *Attorney, Agent, or Firm* — Michael Best & Friedrich LLP

(57) ABSTRACT

The invention relates to a method for producing extruded profiled elements (3) from an elastomer material. In said method, the extruded profiled element (3) is formed from the elastomer material in a first step, the extruded profiled element (3) is entirely or partly surrounded by a thermoplastic material, the elastomer material that is surrounded by the thermoplastic material is cured, and the thermoplastic material is finally removed again once the elastomer material has been cured.

13 Claims, 1 Drawing Sheet

(56) References Cited

U.S. PATENT DOCUMENTS

| | | | |
|---|---|---|---|
| 5,767,185 A * | 6/1998 | Reo | 524/494 |
| 6,004,659 A * | 12/1999 | Leutsch et al. | 428/212 |
| 6,814,565 B2 * | 11/2004 | Kalinowski | 425/403 |
| 2004/0148728 A1 | 8/2004 | Vogt et al. | |

FOREIGN PATENT DOCUMENTS

| | | |
|---|---|---|
| EP | 0415173 B1 | 11/1994 |
| JP | 56123851 A | 9/1981 |
| JP | 57093132 A | 6/1982 |
| JP | 61072507 A | 4/1986 |

\* cited by examiner

PROCESS FOR PRODUCING LINEAR PROFILES

BACKGROUND OF THE INVENTION

The invention relates to a process for producing linear profiles made of an elastomer material.

Linear profiles made of an elastomer material are used by way of example as wiper rubber for windshield wipers in motor vehicles. The wiper rubbers are usually injection-molded or continuously extruded. For this, a previously mixed starting material, for example an unvulcanized natural or synthetic rubber, is molded and vulcanized. For economic reasons it is usual to produce double profiles. To produce individual wiper rubbers, the double profiles are separated along a cut edge after the vulcanization process and during optional subsequent post treatment, this edge generally being the subsequent wiping edge.

The production of a wiper blade encompassing a wiper rubber is disclosed by way of example in DE-A 10 2005 000 851. A coating is applied to the wiper rubber in order to increase wear resistance via a reduction in coefficient of friction. Examples of coatings used are films or granulated materials. The coating here can be applied prior to or after the vulcanization process.

A process for producing a wiper blade is also disclosed in DE-A 101 25 045. The wiper blade comprises a wiper rubber with a wiper-rubber lip. The wiper-rubber lip has been manufactured to some extent from polyethylene, in order to reduce the dry coefficient of friction. The polyethylene here can either have been applied in the form of a coating to the wiper-rubber lip or can be present within the volume of the wiper-rubber lip.

In the wiper rubbers known from the prior art, the coating enters into permanent adhesive bonding with the wiper rubber material.

A disadvantage of the processes known from the prior art for producing wiper rubbers is that the profile, which after the shaping process has not yet been completely vulcanized, is deformed permanently by gravity and flotation forces in the salt bath used for the vulcanization process. The wiper-rubber profiles produced currently have high wall thicknesses, in order to minimize deformation. However, the high wall thicknesses generate a disadvantageous restriction on the functional properties of the wiper rubber, for example in respect of flipover noise.

SUMMARY OF THE INVENTION

The process of the invention for producing linear profiles from an elastomer material encompasses the following steps:

(a) molding of the linear profile from the elastomer material, (b) complete or partial sheathing of the linear profile by a thermoplastic material, (c) vulcanizing the elastomer material sheathed by the thermoplastic material, (d) removing the thermoplastic material after vulcanizing the elastomer material.

The complete or partial sheathing of the linear profile can strengthen the same. The reinforcement due to the sheathing avoids deformation of the linear profile prior to and during the vulcanization process. Filigree, thin-walled linear profiles can thus be produced from elastomer material without deformation. If the linear profile is used as wiper rubber, manufacture of lips and blades made of the wiper rubber can be achieved with much thinner dimensions and with greater process reliability than in the processes known from the prior art.

The linear profile can by way of example be produced via an injection-molding process or an extrusion process. However, it is preferable that the linear profile is molded via an extrusion process.

When, as is preferred, the linear profile is produced via extrusion, the complete or partial sheathing of the linear profile by the thermoplastic material preferably takes place during extrusion of the linear profile. The effect of the complete or partial sheathing of the linear profile during the extrusion process is that the thermoplastic material provides support for the elastomer composition, which is not yet dimensionally stable, until complete vulcanization takes place. The thermoplastic material moreover covers the elastomer material, and the die swell of the elastomer material is therefore reduced, because there is no direct contact of the elastomer material with ambient air. This gives an improvement in surface quality, and as a result of this it is also possible to raise the extrusion rate.

Another advantage is that complete sheathing of the linear profile made of the elastomer material protects the surface of the elastomer material from oxygen during the vulcanization process. This means that production of peroxidic mixtures can also use the hot-air method. This has hitherto been impossible with the processes known from the prior art. The prior art requires vulcanization of peroxidic mixtures in a salt bath.

In order to achieve sheathing of the linear profile by the thermoplastic material before the extrusion process has ended, it is preferable to use a coextrusion process for the molding of the linear profile and for the complete or partial sheathing of the linear profile. In the coextrusion process, the sheathed linear profile is directly discharged from the die.

The thermoplastic material used for the sheathing process is preferably reused after removal. Because the thermoplastic material is reused, the amount required is only small, and production costs can therefore be kept low. Another advantage is that production of the linear profile from the elastomer material does not produce waste of the thermoplastic material.

It is preferable that the elastomer material for the linear profile has been selected from natural rubber, butadiene rubber, chloroprene rubber, ethylene-propylene rubber, ethylene-propylene-diene rubber, urethane rubber, nitrile rubber, styrene-butadiene rubber, cis-1,4-polyisoprene rubber, silicone rubber, methyl-silicone rubber, methyl-silicone rubber having fluorine groups, and mixtures of the same.

It is particularly preferable that the elastomer material for the linear profile has been selected from ethylene-propylene-diene rubber, ethylene-propylene rubber, chloroprene rubber, natural rubber, silicone rubber and mixtures of the same.

To permit easy removal of the thermoplastic material from the elastomer material after the vulcanization process, it is preferable that the thermoplastic material does not enter into any adhesive bonding with the elastomer material. Thermoplastic polymers are particularly suitable as thermoplastic material. Examples of thermoplastic polymers which do not enter into any adhesive bonding with the elastomer material are polyethylene terephthalate (PET), polypropylene (PP), preferably isotactic polypropylene, polycarbonate (PC), polyamide, preferably nylon-6 (PA6), and high-molecular-weight polyethylene (HMWPE). The thermoplastic material used is preferably a filled material, in order that the extrudate also retains dimensional stability at high temperatures, preferably in the range from 120° C. to 200° C. Examples of fillers used are chalk, glass fibers, glass beads, or silicates.

In one embodiment of the invention, the thermoplastic material is extruded using high wall thickness and high temperature. The temperature is preferably in the region above 180° C., in particular in the region from 180° C. to 200° C. By virtue of the high wall thickness, the jacket made of the thermoplastic material serves as heat store, whereupon the heat is used for vulcanizing the elastomer material. The temperature of the elastomer material here during the sheathing process is preferably in the range from 90° C. to 120° C. This method then eliminates the requirement to carry out the vulcanization of the elastomer material in a salt bath or in an oven. There is therefore no need for any expensive vulcanization section.

In one embodiment, the thermoplastic material used for the sheathing process is electrically conductive, so that the thermoplastic material can be used as resistance heating system for the vulcanization process. For this, it is necessary that the electrically conductive thermoplastic material has sufficiently high resistance to be used as resistance heating system. This type of electrically conductive thermoplastic material usually comprises an electrically conductive filler.

It is also possible moreover that at least one substance that reduces coefficient of friction is added to the thermoplastic material, and migrates to the surface of the linear profile made of the elastomer material. Addition of the substance that reduces coefficient of friction reduces the dry coefficient of friction by virtue of migration to the surface of the linear profile. This eliminates adhesion of the linear profile on the windshield of the motor vehicle, when the profile is used as wiper rubber. Use of the substance that reduces coefficient of friction moreover reduces, and preferably prevents, adhesion between the thermoplastic material and the elastomer material. This also facilitates subsequent separation of thermoplastic material and elastomer material.

An example of a suitable substance that reduces coefficient of friction and that can be added to the thermoplastic material is stearamide. The stearamide does not dissolve in the thermoplastic material and therefore migrates to the surface and to the interface formed with the elastomer material. The stearamide together with the filler is usually mixed with the thermoplastic material. The proportion of stearamide is preferably in the range from 1 to 5% by weight, based on the mass of the thermoplastic material.

The linear profile produced by the process of the invention is preferably a profile for a wiper rubber. Wiper rubbers can by way of example be used in windshield wipers for motor vehicles. Wiper rubbers are also used in squeegees for window panes.

Examples of other suitable uses for linear profiles produced in the invention are door seals or window seals. These door seals or window seals can by way of example be used in buildings or else preferably in motor vehicles.

If the linear profile produced in the invention is a wiper rubber for a windshield wiper of a motor vehicle, the linear profile for the wiper rubber is preferably designed as double strip. This type of double strip has the wiping edges of two wiper rubbers bonded to one another. The wiping edge therefore serves as symmetry line. After manufacture, the double strip is separated along the wiping edge, i.e. the symmetry line, to produce individual wiper rubbers. A further advantage of this is that a sharp edge is produced, and gives a better wiping result than the more rounded edge that would be produced if a single wiper rubber were produced.

BRIEF DESCRIPTION OF THE DRAWINGS

Examples of the invention are shown in the drawings and are explained in more detail in the description below.

DETAILED DESCRIPTION

Figure 1:
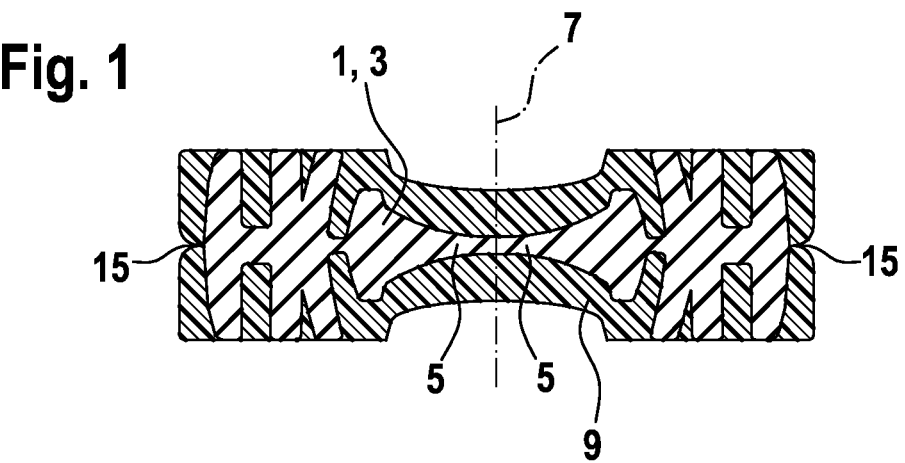
FIG. 1 shows a section through a double strip for a wiper rubber with complete sheathing.

FIG. 1 shows a section through a double strip for a wiper rubber with complete sheathing.

A double strip 1 for a wiper rubber is a linear profile 3, in which two wiper rubbers are molded, with the wiping edge 5 of each bonded to that of the other. To produce individual wiper rubbers, the double strip 1 is separated at the wiping edge 5. The wiping edge 5 here at the same time represents a symmetry line 7 of the double strip 1.

In order to improve the functional properties of the wiper rubber, in particular in order, for example, to reduce flipover noise, it is desirable to form the wiping edge 5 with minimum wall thickness. However, in the production processes known from the prior art, low wall thickness of the wiping edge 5 leads to permanent deformation of the linear profile 3 due to gravity, and also due to flotation forces, in the salt bath in which the double strip 3 is vulcanized. In order to avoid this deformation of the linear profile 3, the linear profile 3 is enclosed by sheathing 9 in the invention. In the example shown in FIG. 1, the sheathing 9 completely encloses the linear profile 3.

Any desired production process known to the person skilled in the art can be used to produce the linear profile 3 and the sheathing 9. The usual production method uses an injection-molding process or an extrusion process. However, it is particularly preferable to use an extrusion process to produce the linear profile 3. To avoid deformation of the linear profile, the sheathing 9 is preferably molded in one production pass with the linear profile 3.

In an extrusion process that is used with preference, the linear profile 3, inclusive of the sheathing 9, is preferably produced via a coextrusion process. In this, the material for the linear profile 3 and the material for the sheathing 9 are forced at the same time through the die for forming the linear profile 3. The linear profile 3 is therefore enclosed by the sheathing 9 during the production procedure. The addition of the material for the linear profile 3 and the sheathing 9 here generally takes place by way of two separate screw-based machines, connected to a shared coextrusion die.

The material for the sheathing 9 is preferably selected in such a way that it is dimensionally stable after traveling just a very short distance downstream of the die, so that deformation of the linear profile 3 is avoided. A thermoplastic material is preferably used as material for the sheathing 9. Examples of particularly suitable materials are polyethylene terephthalate (PET), polypropylene (PP), preferably isotactic polypropylene, polycarbonate (PC), polyamide, preferably nylon-6 (PA6), and high-molecular-weight polyethylene (HMWPE). Care has to be taken here that the thermoplastic material used for the sheathing does not enter into any adhesive bonding with the material of the linear profile 3, in order that the sheathing 9 can be removed after complete vulcanization of the linear profile made of the elastomer material.

If the material for the sheathing 9 by way of example has received admixtures of substances that reduce coefficient of friction, and that are intended to migrate to the surface of the linear profile 3, it is preferable that a prescribed period of storage of the sheathing is also provided after the vulcanization process, in order to permit the substances that reduce coefficient of friction to migrate to the surface of the linear profile 3. The migration can be accelerated by way of example by the heat supplied during the vulcanization process.

Figure 2:
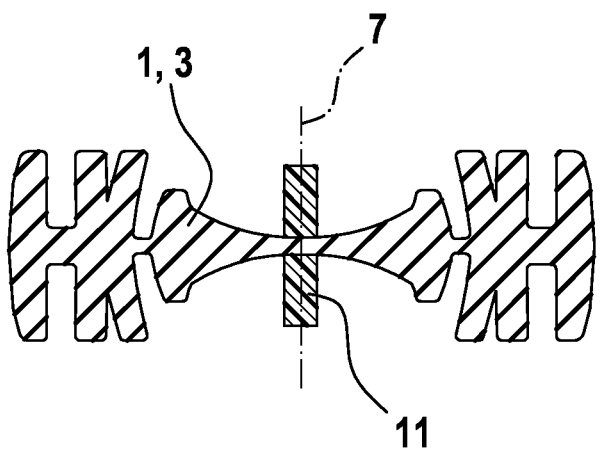
FIG. 2 shows a section through a double strip for a wiper rubber with support in the middle of the lip.

Another possibility, alongside complete sheathing 9, is only partial sheathing of the linear profile 3. FIG. 2 shows this for the example of a support 11 in the middle of the double strip 1. In this case, the sheathing process takes place only in the region of the lowest wall thickness of the linear profile 3. This occurs precisely at the symmetry line 7 at which the double strip 1 is separated to produce the wiper rubbers. The linear profile 3 and the support 11 are produced by a method corresponding to the production of the linear profile 3 with the complete sheathing 9 shown in FIG. 1. It is also preferable that the same thermoplastic materials are used as material for the support 11. The partial sheathing shown in FIG. 2 has the advantage that the support 11 can be designed to require much less thermoplastic material. However, the example shown in FIG. 2 does not permit, for example, use of additives which are intended to migrate to the entire surface of the wiper rubber, since the sheathed region of the wiper rubber is too small. However, it is possible, for example, to achieve targeted sheathing of the linear profile 3 at the positions where additives are intended to be applied to the surface. This method can be used, for example, to achieve targeted adjustment of the surface properties at particular regions of the linear profile 3.

Figure 3:
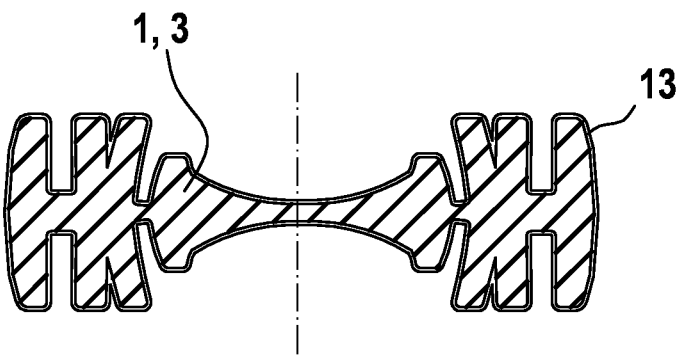
FIG. 3 shows a section through a double strip for a wiper rubber with thin jacket.

Another possibility, alongside the sheathing 9 shown in FIG. 1, which has comparatively high wall thickness, is to use a thin jacket 13 to sheath the linear profile 3. Again, the requirement for material for the sheathing process in the case of the thin jacket 13 shown in FIG. 3 is very much smaller than in the example shown in FIG. 1. If the material for the sheathing has sufficient dimensional stability, the thin jacket 13 is adequate to avoid deformation of the linear profile 3 during the subsequent parts of the production process. A thin jacket 13 is also sufficient, for example, to prevent oxygen from reaching the surface of the linear profile 3. Complete sheathing of the linear profile 3 also prevents this from swelling, since the sheathing material 9, 13 is dimensionally stable and thus prevents the material of the linear profile 3 from expanding. This gives better surface quality of the elastomer material of the linear profile 3. The better dimensional stability can also raise extrusion rate, and therefore production rate.

The complete sheathing shown in FIGS. 1 and 3 protects the surface of the elastomer material from substances from the environment. In particular, no oxygen can reach the surface of the elastomer material. This means that production of peroxidic mixtures can also use the hot-air method, whereas this is impossible with the processes known from the prior art.

In all three examples shown, the elastomer material of the linear profile 3 is vulcanized after the sheathing process. The vulcanization process here takes place by any desired method known to the person skilled in the art. The vulcanization process is usually carried out in a salt bath or in a hot-air duct or infrared duct.

After the vulcanization process and, if appropriate, storage, in order to permit additives to migrate to the surface of the elastomer material of the linear profile 3, the sheathing 9, the support 11, or the thin jacket 13 is removed. The removal is achieved by way of example by peeling or stripping the sheathing 9, the support 11, or the thin jacket 13. To facilitate the peeling or stripping process, the sheathing 9 has, for example, notches 15 provided.

After removal, the thermoplastic material from which the sheathing 9, the support 11, or the thin jacket 13 has been molded is remelted and reused.

Another possibility, alongside the vulcanization process in a salt bath or hot-air duct or infrared duct, is, for example, to add an electrically conductive additive to the thermoplastic material of the sheathing or of the thin jacket 13, so that the thermoplastic material is rendered electrically conductive. If resistance is sufficient, the material of the sheathing 9 or of the thin jacket 13 can then be used as a source of resistance heating for the vulcanization process.

In order to permit removal of the thermoplastic material of the sheathing 9, of the support 11, or of the thin jacket 13 from the elastomer material of the linear profile 3, it is preferable to use a thermoplastic material which does not enter into any adhesive bonding with the elastomer material of the linear profile.

The process of the invention can be used not only for producing double strips 1 for the wiper rubbers shown as examples in FIGS. 1 to 3, but also for producing any desired other linear profile from an elastomer material. It is therefore possible, for example, to use the process of the invention to produce linear profiles for rubber seals or very thin-walled flexible tubing.

What is claimed is:

1. A process for producing linear profiles (3) for a wiper rubber from an elastomer material, the profiles having at least one wiping edge (5), the process comprising the following steps:
   a. molding of the linear profile (3) from the elastomer material,
   b. complete or partial sheathing of the linear profile (3) by a thermoplastic material,
   c. vulcanizing the elastomer material sheathed by the thermoplastic material, and
   d. removing the thermoplastic material after vulcanizing the elastomer material,
   wherein the complete or partial sheathing is sufficient to avoid deformation of the wiping edge (5) until the elastomer material has been completely vulcanized,
   wherein the thermoplastic material has been selected from polyethylene terephthalate, polypropylene, polycarbonate, polyamide, and high-molecular-weight polyethylene having an average molecular weight of from 500,000 g/mol to 1,000,000 g/mol, and
   wherein the thermoplastic material does not enter into any adhesive bonding with the elastomer material.

2. The process as claimed in claim 1, characterized in that the linear profile (3) is molded via an extrusion process.

3. The process as claimed in claim 2, characterized in that the complete or partial sheathing of the linear profile (3) by the thermoplastic material takes place during the extrusion of the linear profile (3).

4. The process as claimed in claim 3, characterized in that a coextrusion process is used for the molding of the linear profile (3) and for the complete or partial sheathing of the linear profile (3).

5. The process as claimed in claim 1, characterized in that the thermoplastic sheathing material (9, 11, 13) is reused after removal.

6. The process as claimed in claim 1, characterized in that the elastomer material for the linear profile (3) has been selected from natural rubber, butadiene rubber, chloroprene rubber, ethylene-propylene rubber, ethylene-propylene-diene rubber, urethane rubber, nitrile rubber, styrene-butadiene rubber, cis-1,4-polyisoprene rubber, silicone rubber, methyl-silicone rubber having fluorine groups, and mixtures of the same.

7. The process as claimed in claim 1, characterized in that the thermoplastic material is nylon-6.

8. The process as claimed in claim 1, characterized in that the thermoplastic material is electrically conductive, and the thermoplastic material can therefore be used as resistance heating system for the vulcanization process.

9. The process as claimed in claim 8, characterized in that the thermoplastic material comprises at least one electrically conductive filler.

10. The process as claimed in claim 1, characterized in that the elastomer material is vulcanized by heat from the sheathing made of the thermoplastic material.

11. The process as claimed in claim 1, characterized in that at least one substance that reduces coefficient of friction is added to the thermoplastic material, and migrates to the surface of the linear profile (3) made of the elastomer material.

12. The process as claimed in claim 1, characterized in that the linear profile (3) for the wiper rubber is in the form of double strip (1).

13. The process as claimed in claim 10, wherein the thermoplastic material serves as a heat store.

* * * * *